United States Patent
Zhang et al.

(10) Patent No.: US 10,061,631 B2
(45) Date of Patent: Aug. 28, 2018

(54) DETECTING UNRESPONSIVENESS OF A PROCESS

(71) Applicant: EMC Corporation, Hopkinton, MA (US)

(72) Inventors: Xufeng Zhang, Beijing (CN); Oliver Yong Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 15/176,656

(22) Filed: Jun. 8, 2016

(65) Prior Publication Data

US 2016/0378587 A1    Dec. 29, 2016

(30) Foreign Application Priority Data

Jun. 25, 2015 (CN) .......................... 2015 1 0359095

(51) Int. Cl.
  *G06F 11/00* (2006.01)
  *G06F 11/07* (2006.01)

(52) U.S. Cl.
  CPC ...... *G06F 11/0757* (2013.01); *G06F 11/0706* (2013.01); *G06F 11/079* (2013.01); *G06F 11/0721* (2013.01); *G06F 11/0772* (2013.01); *G06F 11/0793* (2013.01)

(58) Field of Classification Search
  CPC ............. G06F 11/0706; G06F 11/0721; G06F 11/0757; G06F 11/0772; G06F 11/079; G06F 11/0793
  See application file for complete search history.

(56) References Cited

U.S. PATENT DOCUMENTS

| | | | | |
|---|---|---|---|---|
| 6,550,017 B1* | 4/2003 | Moiin | ................. | G06F 11/0757 714/14 |
| 6,842,898 B1* | 1/2005 | Carlson | ............... | G06F 11/0715 714/E11.003 |
| 9,274,894 B1* | 3/2016 | Perry | ................... | G06F 11/1412 |
| 9,720,761 B2* | 8/2017 | Yu | ......................... | G06F 11/079 |
| 2002/0184482 A1* | 12/2002 | Lacombe | ............ | G06F 11/0757 713/1 |
| 2007/0220375 A1* | 9/2007 | Baz | ...................... | G06F 11/0715 714/55 |
| 2009/0113255 A1* | 4/2009 | Reilly | ................. | G06F 11/0757 714/55 |
| 2010/0088539 A1* | 4/2010 | Stubbs | ................ | G06F 11/0715 714/3 |
| 2012/0041638 A1* | 2/2012 | Johnson | ................. | G07C 5/008 701/33.1 |
| 2012/0158827 A1* | 6/2012 | Mathews | ............ | H04L 12/6418 709/203 |
| 2012/0159259 A1* | 6/2012 | Klein | .................. | G06F 11/0757 714/38.1 |

* cited by examiner

*Primary Examiner* — Joshua P Lottich
(74) *Attorney, Agent, or Firm* — Krishnendu Gupta; Konrad R. Lee

(57) ABSTRACT

Embodiments of the present disclosure disclose a method for detecting unresponsiveness of a process, wherein for each target process in a plurality of target processes, creating and activating a timer on a system kernel side, so as to time the target process; and when timing of the corresponding timer exceeds a predetermined time threshold, determining the target process to be unresponsive, and performing a predetermined associated action.

17 Claims, 6 Drawing Sheets

DETECTING UNRESPONSIVENESS OF A PROCESS

RELATED APPLICATION

This application claim priority from Chinese Patent Application Number CN201510359095.0, filed on Jun. 25, 2015 at the State Intellectual Property Office, China, titled "METHOD AND SYSTEM FOR DETECTING UNRESPONSIVENESS OF A PROCESS," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present disclosure generally relate to detection of process unresponsiveness.

BACKGROUND OF THE INVENTION

Generally, for an operating system, system hang or system unresponsiveness detection at different levels of the system may be critical for better supportability and debugging ability of the system. Usually, a system hang detector, e.g., a watchdog, may be a mechanism for implementing an objective. Generally, a system hang detector may try to convert a system hang or a system unresponsiveness issue into a kernel panic or a process core dump issue. Typically, such a situation may avoid an engineering team from performing a debugging work in a customer environment, but it may usually be impossible in many cases. Usually, with a kernel or process core dump, an engineering team may perform offline analysis, such that further support action may be applied to fix a customer problem.

SUMMARY OF THE INVENTION

Embodiments of the present disclosure intend to provide a method and apparatus for detecting unresponsiveness of a process so as to solve the above problems. One embodiment provides a method for detecting unresponsiveness of a process, by for each target process in a plurality of target processes, creating and activating a timer on the system kernel side, so as to time the target process; and when timing of the corresponding timer exceeds a predetermined time threshold, determining the target process to be unresponsive, and performing a predetermined associated action.

BRIEF DESCRIPTION OF THE DRAWINGS

The accompanying drawings here are used to provide further understanding of the present disclosure and thus constitute part of the present disclosure; the schematic embodiments of the present disclosure and their explanations are used for explaining the present disclosure, not constituting improper definition to the present disclosure. In the accompanying drawings.

In respective drawings, same or corresponding reference numerals represent same or corresponding portions.

DETAILED DESCRIPTION OF THE PREFERRED EMBODIMENTS

Figure 1:
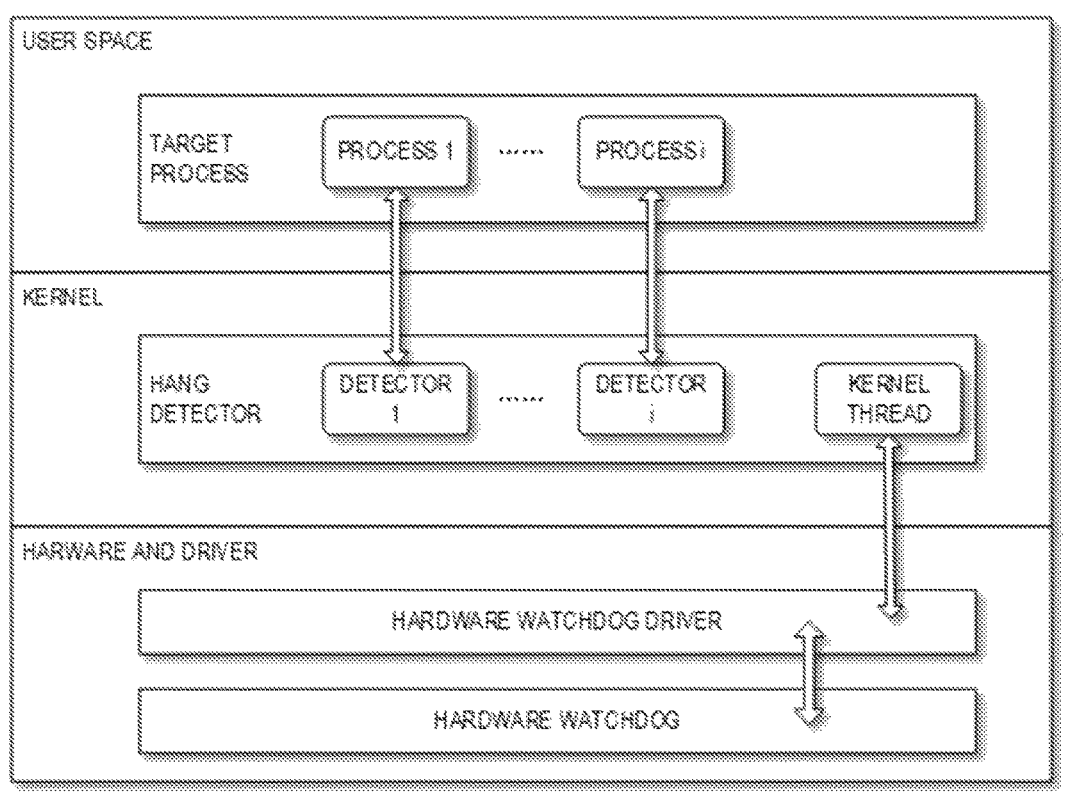
FIG. 1 schematically illustrates an exemplary system architecture diagram for detecting process unresponsiveness according to the embodiments of the present disclosure with Linux operating system as an example.

Hereinafter, various exemplary embodiments of the present disclosure will be described in detail with reference to the accompanying drawings. It should be noted that these drawings and description relate only exemplary embodiments. It should be noted that based on subsequent depiction, alternative embodiments of the structure and method disclosed here can be easily contemplated, and these alternative embodiments may be used without departing from the principle as claimed in the present disclosure.

It should be understood that these exemplary embodiments are provided only to enable those skilled in the art to better understand and the further implement the present disclosure, not intended to limit the scope of the present disclosure in any manner.

The terms "comprise", "include" and the like used here should be understood as open terms, i.e., "comprise/include, but not limited to". The term "based on" means "at least partially based on". The term "one embodiment" indicates "at least one embodiment"; the term "another embodiment" indicates "at least one further embodiment". Moreover, such phrases are not necessarily referring to the same embodiment. It should also be understood that various terminology used herein is for the purpose of describing particular embodiments only and is not intended to be liming of the disclosure. As used herein, the singular forms "a", "an" and "the" may include the plural forms, unless the context clearly indicates otherwise. It will be further understood that the terms "comprises", "has" and "including" used herein, specify the presence of stated features, elements, and/or components etc., but do not preclude the presence of one or more other features, elements, components and/or combinations thereof. For example, the term "multiple" used here indicates "two or more"; the term "and/or" used here may comprise any or all combinations of one or more of the items listed in parallel. Definitions of other terms will be specifically provided in the following description. Furthermore, in the following description, some functions or structures well-known to those skilled in the art will be omitted in order not to obscure embodiments of the disclosure in the unnecessary details.

In some embodiments, a system hang detector may involve two parts: a monitor target and a detector (or watchdog). Usually, a monitor target may refer to a hardware or software context to be checked by the system hang detector, which may be a process, thread, software/hardware interrupt, or user/kernel space APIs (Application Programming Interface). In some other embodiments, a detector may refer to another software or hardware context that periodically checks hardware or software events from a related monitor target. In yet some other embodiments, if hardware or software events indicate occurrence of a system hang issue, the detector may take action to recover the monitor target, e.g., trigger the process core dump, kernel or platform to be hard reset.

According to some embodiments, a hang detector (system hand detector) may be divided into two categories: a hardware hang detector and a software hang detector. In some embodiments, a hardware hang detector may generally need additional hardware support, while the hardware may usually not be owned by a host operating system, such that even when the host is dead, the hardware may still control the system. In some other embodiments, an operating system and a process may send a heartbeat message to a hardware hang detector. In some other embodiments, if a hardware hang detector does not receive a heartbeat message within a certain period of time, it may trigger a kernel panic or a system reset. In some other embodiments, a software hang detector may be a software component in a host operating system, which may receive a heartbeat message from a target process (or thread). In yet some other embodiments, if no heartbeat message is received, the software hang detector may cause a system panic or only kill a target process.

In certain embodiments, depending on use scenarios, a hang detector may be divided into two types: a kernel space hang detector and a user space hang detector. In some embodiments, a kernel space hang detector may need to process two sorts of problems: process hang caused by CPU (Central Processing Unit) lockup, which may usually be caused by inappropriate interrupt time or task starvation due to spinlock deadlock; and process stuck caused by process sleep, which may usually be caused by deadlock between non-spinlocks or memory or input output (I/O) resources. In some other embodiments, a most common implementation manner of a user space hang detector may be to introduce another detector process in a user space to detect a specific user process hang issue. In an example embodiment, process A may be a monitor target, while process B may be a hang detector, and process A may periodically send a heartbeat message to process B. and if process B cannot timely receive a heartbeat message, process B may kill process A or cause a system panic.

In some embodiments, some of these existing hang detectors may have various disadvantages or drawbacks. In some other embodiments, a typical hardware hang detector, e.g., an intelligent platform management interface (IPMI) watchdog and a platform controller center (PCH) or I/O controller center (ICH) watchdog may have a hardware dependency problem and scalability problem. In some other embodiments, a hardware hang detector may usually only be used for specific types of hardware, and there may be usually only one timer instance provided by hardware, such that it may hardly be used for hang detection of multiple processes, particularly when different processes have different time sequence requirements. In some other embodiments, a kernel space hang detector may usually have only kernel scheduling information, while a transaction hang of a user space may need to know a time requirement of the user space transaction; therefore, a kernel space detector may always have its limitation. In some other embodiments, a user space hang detector may have information about a user space transaction and may detect a user space hang problem through an appropriate design; however, it may have significant drawbacks and limitations in aspects of reliability and scalability. In an example embodiment, when a kernel runs into a problem, a user space hang detector per se may get stuck. In some other embodiments, when a hang detector wants to take an action, code that triggers the action might also run into a problem. In another example embodiment, a user space hang detector may be generally an ad hoc implementation, such that it may not effectively extend its function to support a new user space transaction. In yet some other embodiments, both a monitor target and a detector may need to modify the code. In some embodiments, a more efficient technical solution may be desired to detect a system hang or a system unresponsiveness of a process in a system.

One embodiment provides a method for detecting unresponsiveness of a process, by for each target process in a plurality of target processes, creating and activating a timer on the system kernel side, so as to time the target process. In a further embodiment may include determining a target process to be unresponsive when timing of a corresponding timer exceeds a predetermined time threshold. A further embodiment may include performing a predetermined associated action.

In one embodiment, a target process is a user space process. In another embodiment, a predetermined time threshold and a predetermined associated action may be set in response to a setting command from a target process. A further embodiment may include resetting a corresponding timer so as to retime the target process in response to receiving a heartbeat message from a target process. Yet a further embodiment may include that a timer records a flag indicating receipt of a predetermined character from a target process.

In a further embodiment, resetting the corresponding timer so as to retime the target process in response to receiving a heartbeat message from a target process may include obtaining a character written by a target process from a heartbeat message. A further embodiment may include setting a flag to indicate receipt of a predetermined character from a target process in response to determining that a character is a predetermined character. A further embodiment may include, in response to receiving a close message from a target process, performing a corresponding operation based on a flag indicating receipt of a predetermined character from a target process. A further embodiment may include, stopping a corresponding timer when a flag indicates receipt of a predetermined character from a target process. A further embodiment may include keeping a corresponding timer running when a flag does not indicate receipt of a predetermined character from a target process.

A further embodiment may include creating a real-time kernel thread on a system kernel side to periodically transmit a heartbeat message to a hardware watchdog. Yet a further embodiment may include, when a fatal problem occurs, stopping transmission of a heartbeat message to a hardware watchdog because a kernel may not work normally, such that a hardware watchdog performs resetting of a system. In a further embodiment, a hardware watchdog may refer to one or more hardware watchdogs of one or more types.

One embodiment may include an apparatus for detecting unresponsiveness of a process. A further embodiment may include a timing module that may be configured to, for each target process in a plurality of target processes, create and activate a timer on a system kernel side, so as to time a target process. A further embodiment may include an unresponsiveness determining module that may be configured to, when timing of a corresponding timer exceeds a predetermined time threshold, determine a target process to be unresponsive, and perform a predetermined associated action. In one embodiment, a target process may be a user space process.

In another embodiment, a predetermined time threshold and a predetermined associated action may be set in response to a setting command from a target process. In a further embodiment, a heartbeat response module may be configured to, in response to receiving a heartbeat message from a target process, reset a corresponding timer so as to retime a target process. A further embodiment may include that a timer records a flag indicating receipt of a predetermined character from a target process.

In a further embodiment, a heartbeat response module may be configured to: obtain a character written by a target process from the heartbeat message. A further embodiment may include, in response to determining that a character is a predetermined character, set a flag to indicate a receipt of a predetermined character from a target process. A further embodiment may include a close response module that may be configured to, in response to receiving a close message from a target process, perform a corresponding operation based on a flag indicating a receipt of a predetermined character from a target process.

A further embodiment may include a close response module that may be configured to: stop a corresponding timer when a flag indicates a receipt of a predetermined character from a target process. A further embodiment may include to keep a corresponding timer running when a flag may not indicate a receipt of a predetermined character from a target process.

A further embodiment may include a hardware unresponsiveness detecting module, wherein the hardware unresponsiveness detecting module may be configured to create a real-time kernel thread on a system kernel side to periodically transmit a heartbeat message to a hardware watchdog. A further embodiment may include stop transmission of a heartbeat message to a hardware watchdog, when a fatal problem occurs, because a kernel cannot work normally, such that the hardware watchdog performs resetting of the system. In a further embodiment, a hardware watchdog may refer to one or more hardware watchdogs of one or more types.

According to another embodiment, there is provided a computer program product for detecting unresponsiveness of a process, the computer program product being tangibly stored on a non-transient computer readable medium and including computer executable instructions that, when being executed, cause the computer to execute any step of the method steps disclosed above.

Embodiments of the present disclosure may support multiple monitor targets and provide dynamic scalability thereof, which implement monitoring of a user space transaction on a system kernel layer, and execute communication between a monitor target and a detector through system calls. Embodiment of the present disclosure may also manage and leverage an underlying hardware watchdog, which may effectively enhance scalability and reliability of a process unresponsiveness detection and overcome a hardware dependency.

Hereinafter, the accompanying drawings will be referenced to describe in detail the technical solution of detecting process unresponsiveness according to the embodiments of the present disclosure. Reference is made to FIG. 1, an exemplary system architecture diagram for detecting process unresponsiveness according to the embodiments of the present disclosure, which will be described with the Linux operating system as an example.

As shown in FIG. 1, an exemplary system architecture for detecting process unresponsiveness may be divided into three layers: user space layer, kernel layer, and hardware and driver layer. According to the embodiments of the present disclosure, all target processes run in user space. The process hang detector is implemented as a system kernel module, which provides a group of APIs to the target process so as to allow the target process to use this group of APIs to manage the process hang detector and communicate with the process hang detector.

As mentioned above, a process hang detector is implemented as a system kernel module. For example, in the Linux operating system, when the process hang detector module is loaded, the following initialization operations are performed: defining a specific timer data structure for managing each target process (hereinafter, for the sake of simplification, an instance of the specific timer data structure is shortly referred to as a hang detector or a detector), wherein the specific timer data structure includes a standard kernel timer, an timeout value for the standard kernel timer, and an action associated with the timeout, a target process identifier (ID), a target process name, a flag indicating whether a predetermined character (e.g., "V") has been received, and an ID of the timer in a bitmap. Initialization operations include declaring and registering a character device into the kernel. The character device including a device number, a device name, and file operations; allocating a memory of a certain size for the bitmap. Initialization operations further include creating a real-time kernel thread for transmitting a heartbeat message to the hardware watchdog. After the above operations are completed, the process hang detector is visible on the user space side.

Next, the user space process (i.e., target process) may be used to operate the process hang detector through file system calls. With the example of a Linux operating system, general file system calls include: open( ), for creating a new process hang detector for a target process; write( ), for executing a ping operation on the created hang detector, i.e., transmitting a heartbeat message to the hang detector; ioctl( ), for setting a timeout value for the hang detector and an action associated with the timeout through a control command; and close( ), for deleting the hang detector for the target process. Making the target process communicate with the hang detector in a manner of using system calls may simplify implementation for supporting multiple target processes and heartbeat message transmission. It should be understood that other manners may also be used for communication between the target process and the hang detector, e.g., an inter-process communication (IPC) mechanism.

The process hang detector may also manage the hardware watchdog using a hardware watchdog API and communicates with the hardware watchdog. A hardware watchdog driver (e.g., IPMI watchdog, PCH watchdog, and an ICH watchdog) is usually defaulted to be available in most operating systems. When removing the process hang detector module from the system kernel, the following cleaning operations are performed: stopping the relevant kernel thread, and deregistering a character device, and freeing the memory space allocated to the bitmap.

Figure 2:
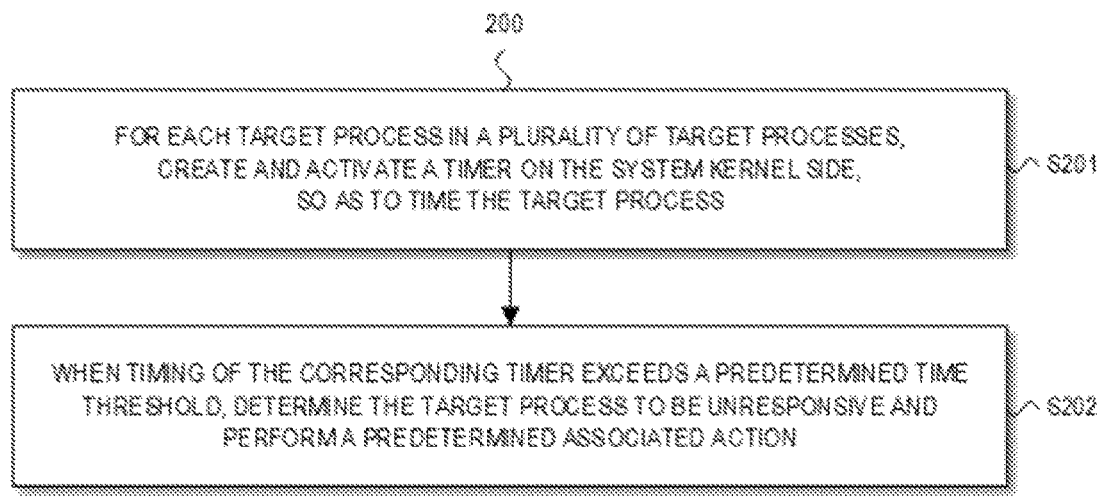
FIG. 2 schematically illustrates an exemplary flow diagram of a method 200 for detecting process unresponsiveness according to one embodiment of the present disclosure.

Reference is now made to FIG. 2, in which a flow diagram of a method 200 for detecting process unresponsiveness according to one embodiment of the present disclosure is presented. In step S201, for each target process in a plurality of target processes, create and activate a timer on the system kernel side, so as to time the target process. In step S202, when the timing of the corresponding timer exceeds a predetermined time threshold, the target process is determined to be unresponsive, and a predetermined associated action is executed.

According to embodiments of the present disclosure, a target process is a user space process. In an embodiment with an exemplary system architecture as a Linux operating system shown in FIG. 1, when a user space process invokes open( ), a hang detector for a user space process (i.e., target process) may be created. In an example embodiment, a module driver may first attempt to find an empty slot in a bitmap. In a further embodiment, it is found, a detector (as mentioned above, detector is for managing an instance of the specific timer data structure for each target process) may be assigned to a user space. In a further embodiment, a slot identifier may also be needed to be stored in a specific timer data structure, such that an operated detector may be identified in other file system calls. In a further embodiment, after a detector is successfully created, a reference count of a process hang detector module may need to be incremented. In a further embodiment, finally, a detector may be activated, i.e., a standard kernel timer therein may be initiated to time the target process.

In step S202, when the timing of the corresponding timer exceeds a predetermined time threshold, the target process is determined to be unresponsive, and a predetermined associated action is executed. According to embodiments of the present disclosure, a predetermined time threshold and a predetermined associated action may be set in response to a setting command from the target process. In an example embodiment, it may be continuously described based on an exemplary system architecture in a Linux operating system as shown in FIG. 1, that when a user space process invokes ioctl( ), a corresponding operation may be executed based on the specific command passed to ioctl( ), for example, obtaining a timeout value for a standard kernel timer, setting a timeout value, and setting an action associated with the timeout, etc. In a further embodiment, if a timing for a user space process exceeds a timeout value as set for a standard kernel timer, a user space process may be determined to be unresponsive, and an action set to be associated with a timeout may be executed. In a further embodiment, an action associated with a timeout may include, for example, printing log information on console to show a timeout process, causing an entire system panic, or dumping stack trace information, etc.

In an alternative or additional embodiment, method 200 may also include the following steps: creating a real-time kernel thread on a system kernel side so as to periodically transmit a heartbeat message to a hardware watchdog; and when a fatal problem occurs, stopping transmission of a heartbeat message to a hardware watchdog because a kernel cannot work normally such that a hardware watchdog performs resetting of a system. Through these steps, embodiments of the present disclosure may effectively enhance the reliability of process unresponsiveness detection using an underlying hardware watchdog.

Figure 3:
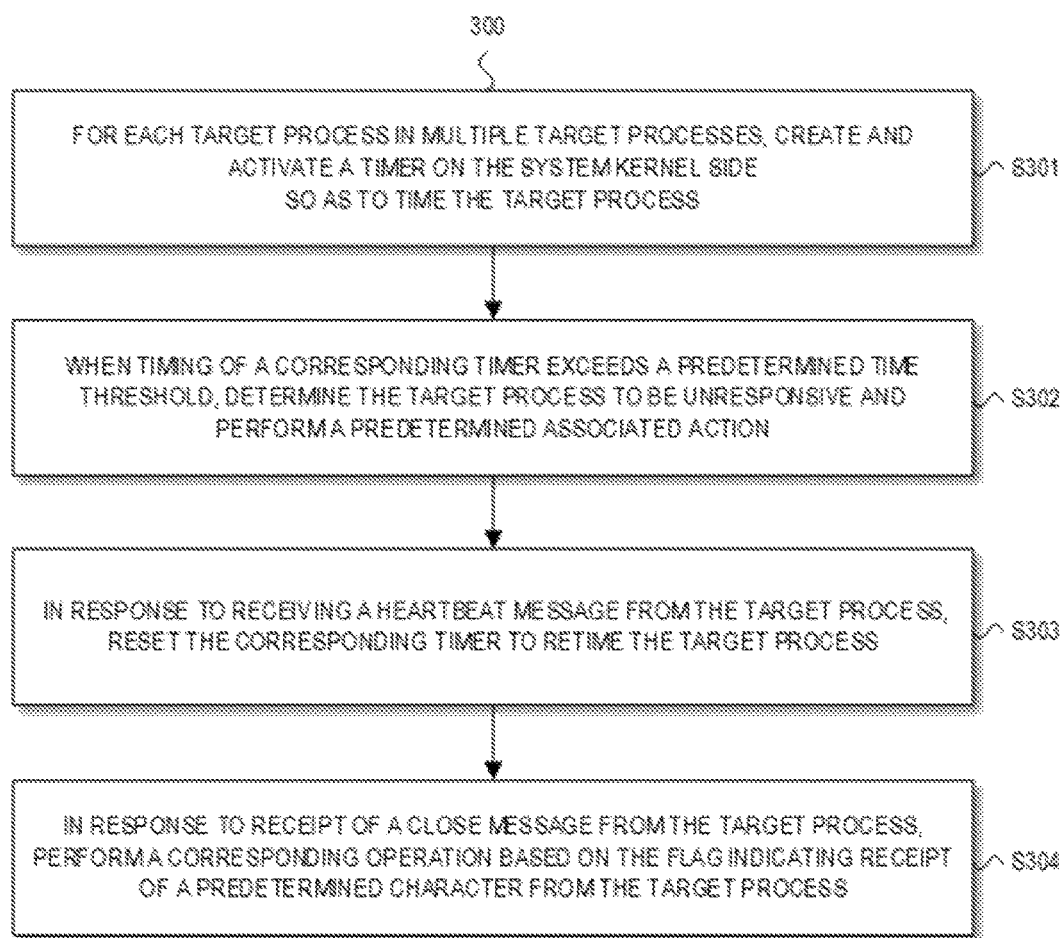
FIG. 3 schematically illustrates an exemplary flow diagram of a method 300 for detecting process unresponsiveness according to another embodiment of the present disclosure.

Reference is now made to FIG. 3, in which a flow diagram of a method 300 for detecting process unresponsiveness according to a further embodiment of the present disclosure is presented. In step S301, for each target process in multiple target processes, a timer is created and activated on the system kernel side so as to time the target process. In step S302, when timing of a corresponding timer exceeds a predetermined time threshold, the target process is determined to be unresponsive, and a predetermined associated action is performed. The above two steps are identical to step S201 and step S202 in the method 200, respectively, which will not be detailed here. In step S303, in response to receiving a heartbeat message from the target process, the corresponding timer is reset to retime the target process. In step S304, in response to receipt of a close message from the target process, a corresponding operation is performed based on the flag indicating the receipt of the predetermined character from the target process.

In an example embodiment, continue depiction based on an exemplary system architecture in a Linux operating system as shown in FIG. 1, a user space process may transmit a heartbeat message to the hang detector by invoking write( ). In a further embodiment, a heartbeat message may indicate that a user space process may not be hung, i.e., a user space process may have responsiveness. In a further embodiment, in response to receipt of a heartbeat message from a user space process, a detector will be reset, i.e., re-starting timing for a user space process.

According to embodiments of the present disclosure, a timer records a flag indicating receipt of a predetermined character from the target process. In a further embodiment, with an exemplary system architecture in a Linux operating system as shown in FIG. 1 as an example, a specific timer data structure for managing each target process may be defined in a system kernel (an instance of the specific timer data structure is shortly referred to as a hang detector or a detector), including a flag indicating whether a predetermined character (e.g., "V") has been received. In a further embodiment a flag may be used for a specific timer stop function based on the embodiments of the present disclosure.

According to embodiments of the present disclosure, step S303 may further include: obtaining a character written by a target process from a heartbeat message. A further embodiment may include in response to determining that a character is a predetermined character, setting a flag to indicate a receipt of a predetermined character from the target process. In an example embodiment, a user space process may transmit a heartbeat message to a hang detector by invoking write( ). In a further embodiment a heartbeat message may include a character written by a user space process, e.g., "V." In a further embodiment, when a character is a predetermined character (e.g., "V"), a corresponding flag may be set to indicating a receipt of a predetermined character, e.g., 1. In an alternate embodiment, when a character is not a predetermined character, a corresponding flag may not be set, i.e., a flag equals its default value, e.g., 0.

In step S304, in response to receipt of a close message from the target process, a corresponding operation is performed based on the flag indicating the receipt of the predetermined character from the target process. Based on embodiments of the present disclosure, an operation may include: stopping a corresponding timer when a flag indicates a receipt of a predetermined character from a target process. A further embodiment may include keeping a corresponding timer running when a flag dos not indicate a receipt of a specific character from a target process.

In an example embodiment, with an exemplary system architecture in a Linux operating system as shown in FIG. 1 as an example, a user space process may stop a timing of a user space process by invoking close( ), and delete a hang detector assigned to a user space process. In a further embodiment, when a flag in a hang detector indicated a receipt of a predetermined character (e.g., "V"), a running timer may be stopped and deleted. In a further embodiment, a module reference count may be decremented. In a further embodiment, a memory space allocated for a hang detector may be released, and meanwhile a corresponding slot in a bitmap may be cleared. In a further embodiment, if a flag does not indicate receipt of a predetermined character (e.g., "V"), a hang detector may be kept running, i.e., a timer continues a timing for a user space process.

In an alternative or additional embodiment, method 300 may further include the following steps: creating a real-time kernel thread on a system kernel side, so as to periodically transmit a heartbeat message to a hardware watchdog; and when a fatal problem occurs, stopping transmission of a heartbeat message to a hardware watchdog, so as to facilitate a hardware watchdog to reset a system. Through these steps, embodiments of the present disclosure may effectively enhance the reliability of the process unresponsiveness detection using an underlying hardware watchdog.

In practice, the method for detecting process unresponsiveness according to embodiments of the present disclosure may be applied to many scenarios. Hereinafter, a plurality of examples may be listed for illustration. For example, embodiments of the present disclosure may be used to monitor a failover program in a high availability (HA) system. In a further embodiment, when a HA starts, a hang detector may be created and a timeout value may be set, e.g., 10 seconds. In a further embodiment, a HA transmits a heartbeat message to a hang detector with a 2 s interval. In a further embodiment, when failover starts, a HA may stop transmission of a heartbeat message to a hang detector and may start running some programs. In a further embodiment, if these programs are completed and time as consumed is less than 10 s, a HA may restart transmission of a heartbeat message to a hang detector so as to keep a system active. In a further embodiment, if these programs cannot be completed within 10 s, a hang detector may cause a system panic and immediately to be reset. In a further embodiment, when an operating system has no response, an action of a hang detector might be unable to be triggered; in this case, a platform reset may be triggered by a hardware watchdog.

For example, embodiments of the present disclosure may be used to monitor some key system states and events, e.g., the memory pressure and system 110 state. In a further embodiment, with monitoring a memory pressure as an example, an application may create a hang detector and set a timeout value, e.g., 6 minutes. In a further embodiment, in one cycle, system available memory may be checked every 2 minutes. In a further embodiment, if available memory is lower than a pressure threshold, a next cycle may start and a heartbeat message may be transmitted to a hang detector; otherwise, an application may transmit a heartbeat message to the hang detector. In a further embodiment, if a system memory is under a pressure (i.e., the available memory is lower than a pressure threshold) for 6 minutes, for some systems, certain problems may likely arise; in this case, a hang detector may trigger a failure path: kernel panic and disk dump, so as to save a current memory into a disk for debugging.

Figure 4:
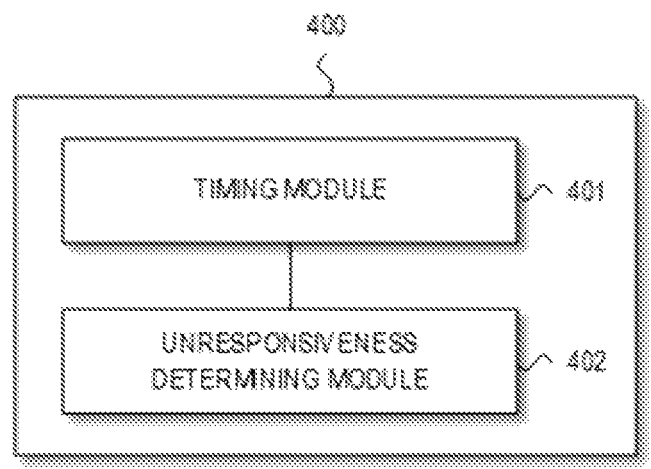
FIG. 4 schematically illustrates an exemplary block diagram of an apparatus 400 for detecting process unresponsiveness according to one embodiment of the present disclosure.

Hereinafter, FIG. 4 will be referenced, in which a block diagram of apparatus 400 for detecting process unresponsiveness according to one embodiment of the present disclosure is presented. Apparatus 400 include timing module 401 configured to, for each target process in a plurality of target processes, create and activate a timer on the system kernel side, so as to time the target process; and unresponsiveness determining module 402 configured to, when timing of the corresponding timer exceeds a predetermined time threshold, determine the target process to be unresponsive, and perform a predetermined associated action.

According to embodiments of the present disclosure, a target process may be a user space process, and a predetermined time threshold and a predetermined associated action may be set in response to a setting command from the target process.

In an alternative or additional embodiment, apparatus 400 may further include: a hardware unresponsiveness detecting module, the hardware unresponsiveness detecting module may be configured to create a real-time kernel thread on a kernel side of a system to periodically transmit a heartbeat message to a hardware watchdog. In a further embodiment, stop transmission of a heartbeat message to the hardware watchdog, when a fatal problem occurs, because a kernel cannot work normally, such that a hardware watchdog performs resetting of a system.

Figure 5:
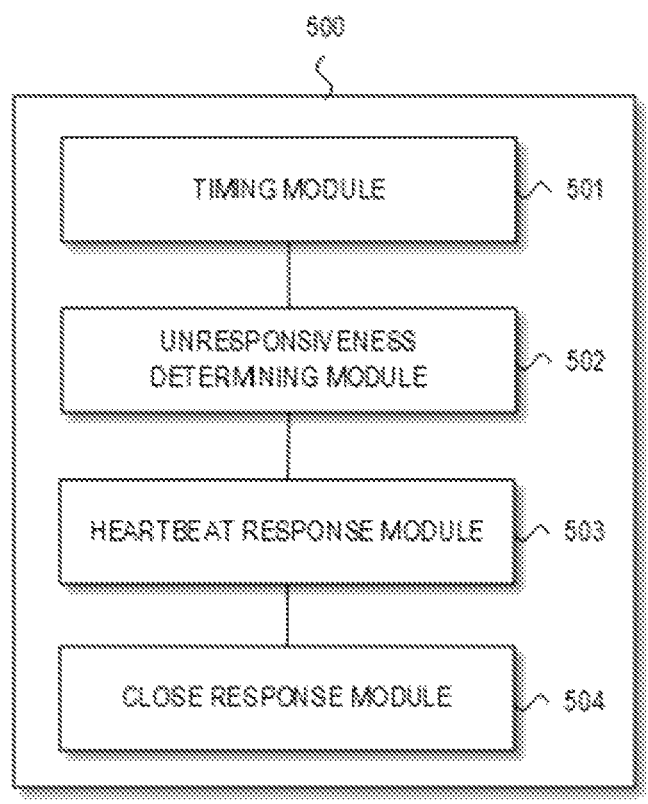
FIG. 5 schematically illustrates an exemplary apparatus 500 for detecting process unresponsiveness according to another embodiment of the present disclosure.

Hereinafter, FIG. 5 will be referenced, in which a flow diagram of apparatus 500 for detecting process unresponsiveness according to an embodiment of the present disclosure is presented. Apparatus 500 includes timing module 501 configured to, for each target process in a plurality of target processes, create and activate a timer on the system kernel side, so as to time the target process; and unresponsiveness determining module 502 configured to, when timing of the corresponding timer exceeds a predetermined time threshold, determine the target process to be unresponsive, and perform a predetermined associated action; heartbeat response module 503 configured to, in response to receiving a heartbeat message from the target process, reset the corresponding timer so as to retime the target process; and close response module 504 configured to, in response to receiving a close message from the target process, perform a corresponding operation based on the flag indicating receipt of a predetermined character from the target process, the operation including: stopping the corresponding timer when the flag indicates receipt of the predetermined character from the target process; and keeping the corresponding timer running when the flag does not indicate the receipt of the specific character from the target process.

In an alternate or additional embodiment, apparatus 500 may include a hardware unresponsiveness detection module, the hardware unresponsiveness detection module being configured to: create a real-time kernel thread on the kernel side of a system to periodically transmit a heartbeat message to a hardware watchdog. In a further embodiment, when a fatal problem occurs, stop transmission of a heartbeat message to a hardware watchdog, such that the hardware watchdog performs resetting of a system. According to embodiments of the present disclosure, a hardware watchdog may be one or more hardware watchdogs of one or more types.

Figure 6:
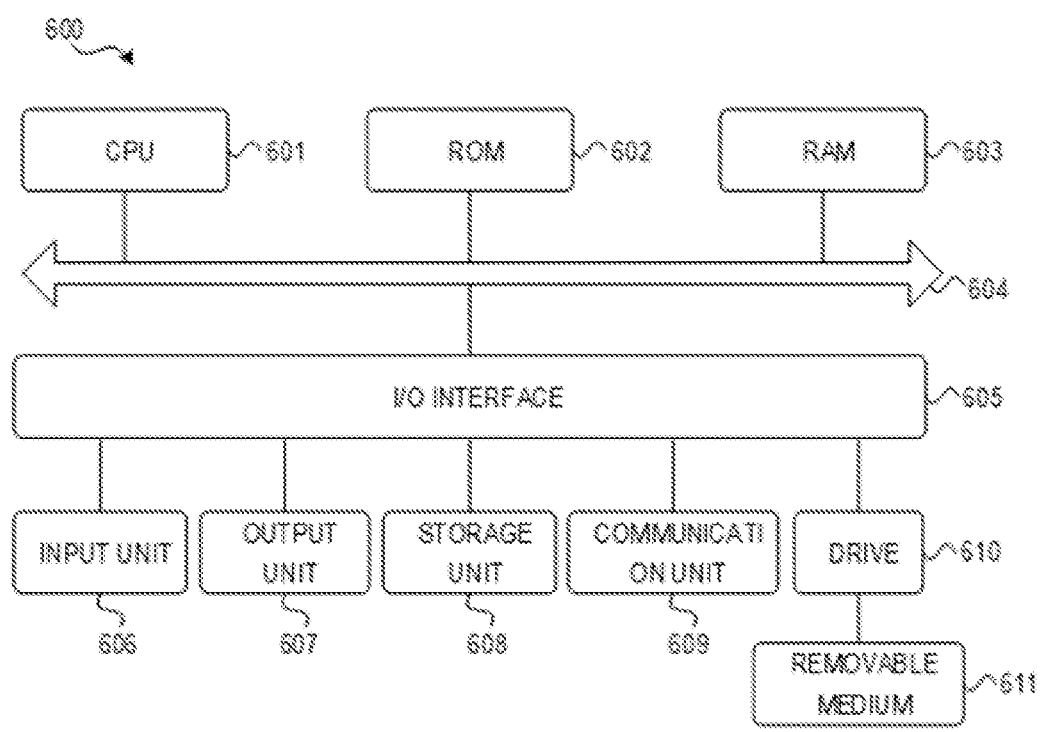
FIG. 6 schematically illustrates a block diagram of a computer system adapted to implement exemplary embodiments of the present disclosure.

Hereinafter, refer to FIG. 6, in which a block diagram of a computer system adapted to implement exemplary embodiments of the present disclosure is presented. As shown in FIG. 6, computer system 600 includes central processing unit (CPU) 601, which may perform any proper actions and processing based on a program stored in read-only memory (ROM) 602 or a program loaded from memory section 608 to random access memory (ROM) 603. RAM 603, may further store various programs and data needed for operations of apparatus 400 or apparatus 500. CPU 601, ROM 602, and RAM 603 are connected to each other via a bus 604. Input/output (I/O) interface 605 is also connected to bus 604.

The following components are connected to I/O interface 605: an input part including a keyboard, a mouse and the like; output part 607 including a cathode ray tube (CRT), a liquid crystal display (LCD) and a loudspeaker, etc.; memory part 608 including a hard disk, etc.; communication part 609 including a network interface card such as LAN card, model, etc. Communication part 609 performs communication processing via a network such as Internet. Drive 610 may also be connected to I/O interface 605 as needed. Removable medium 611, such as a magnetic disk, an optic disk, a magneto-optical disk, a semiconductor memory, and the like, is mounted on drive 610 as required, such that a computer program read therefrom is mounted in the storage part 608 as required.

In particular, according to embodiments of the present disclosure, method 200 described with reference to FIG. 2 and method 300 described with reference to FIG. 3 may be implemented as computer software programs. For example, embodiments of the present disclosure include a computer program product that may be tangibly stored on a non-transient computer-readable medium and includes a computer executable instruction, the computer executable instruction, when being executed, causes the computer to perform any step of the methods 200 and/or 300.

In view of the above, according to embodiments of the present disclosure, there is provided a method and apparatus for detecting unresponsiveness of a process. Embodiments of the present disclosure may support multiple monitor targets and provide dynamic scalability thereof, which implement monitoring of a user space transaction on a system kernel layer, and execute communication between a monitor target and a detector through system calls, and meanwhile can manage and leverage a underlying hardware watchdog, which may effectively enhance scalability and reliability of process unresponsiveness detection and overcome hardware dependency.

Generally, various exemplary embodiments of the present disclosure may be implemented in hardware or a specific circuit, software, logic, or any combination thereof. Some aspects may be implemented in hardware, while other aspects may be implemented in firmware or software executable by a controller, a microprocessor, or other computing device. When various aspects of embodiments of the present disclosure are illustrated or described with block diagrams, flow diagrams or other graphical representations, it would be appreciated that the blocks, apparatuses, systems, technologies or methods described here may be implemented as non-limitative examples in hardware, software, firmware, specific circuit or logic, general hardware or controller or other computing device, or some combinations thereof.

Moreover, respective blocks in the flow diagram may be regarded as method steps, and/or operations generated by computer program code, and/or understood as a plurality of multiple logical circuit elements for performing relevant functions. For example, embodiments of the present disclosure include a computer program product that includes a computer program tangibly embodied on a machine readable medium, the computer program including program code configured to implement the above described methods.

Within the context of the present disclosure, machine readable medium may be any tangible medium including or storing programs for or related to the instruction execution system, apparatus, or device. The machine readable medium may include, but not limited to, electronic, magnetic, optical, electro-magnetic, infrared or semiconductor system, apparatus or device, or any combination thereof. Mode detailed examples of the machine-readable storage medium include an electric connection with one or more wires, a portable computer magnetic disk, hard disk, random access memory (RAM), read-only memory (ROM), erasable programmable read-only memory (EPROM or flash memory), optical storage device, magnetic storage device, or any appropriate combination thereof.

Computer program code for implementing methods of the disclosure may be compiled with one or more programming languages. These computer program code may be provided to a processor of a general computer, a dedicated computer or other programmable data processing device, such that the program code, when being executed by a computer or other programmable data processing device, causes functions/operations specified in the flow diagrams and/or blocks to be implemented. The program code may be executed completely on the computer, partially on the computer, as an independent software packet, partially on the computer while partially on a remote computer, or completely on the remote computer or server.

Additionally, although the operations are described in a specific order, it should not be understood that such operations are performed in the shown specific order or in a successive order, or all of the shown operations are performed to obtain a desired result. In some cases, multi-task or parallel processing would be beneficial. Likewise, although some specific implementation details are included in the above discussion, it should not be explained as limiting the scope of any invention or claims, but should be explained as a depiction that may be directed to a specific embodiment of a specific invention. Some features described in the contexts of separate embodiments may also be consolidated and implemented in a single embodiment. Alternatively, various features depicted in the context of a single embodiment may also be scattered and implemented in a plurality of embodiments or in any appropriate sub-combinations.

Various modifications and changes to the exemplary embodiments of the present disclosure will become apparent to those skilled in the art when viewing the above description along with the accompanying drawings. Any and all modifications will still fall within the scope of the non-limitative exemplary embodiments of the present disclosure. Besides, the above description and drawings have teaching benefits. Those skilled in the art related to these embodiments of the present disclosure will contemplate other embodiments of the present disclosure as illustrated here.

It would be appreciated that embodiments of the present disclosure are not limited to specific embodiments of the present disclosure, and modifications and other embodiments should all be included within the scope of the appended claims. Although specific terms are used here, they are only used in general and descriptive senses, not for a purpose of limitation.

What is claimed is:

1. A method for detecting unresponsiveness of a process, the method comprising:
    for each target process in a plurality of target processes, creating and activating a timer on a system kernel side to time the target process; and
    when timing of the timer exceeds a predetermined time threshold, determining the target process to be unresponsive, and performing a predetermined associated action;
    wherein the predetermined time threshold and the predetermined associated action are set in response to a setting command from the target process.

2. The method according to claim 1, wherein the target process is a user space process.

3. The method according to claim 1, further comprising: in response to receiving a heartbeat message from the target process, resetting the timer to retime the target process.

4. The method according to claim 3, wherein the timer records a flag indicating receipt of a predetermined character from the target process.

5. The method according to claim 4, wherein in response to receiving a heartbeat message from the target process, resetting the timer to retime the target process comprises:
   obtaining a character written by the target process from the heartbeat message; and
   in response to determining that the character is the predetermined character, setting the flag indicating receipt of the predetermined character from the target process.

6. The method according to claim 5, further comprising: in response to receiving a close message from the target process, performing a corresponding operation based on the flag indicating receipt of the predetermined character from the target process.

7. The method according to claim 6, wherein in response to receiving a close message from the target process, performing a corresponding operation based on the flag indicating receipt of the predetermined character from the target process comprises:
   stopping the timer when the flag indicating receipt of the predetermined character from the target process; and
   keeping the timer running when the flag is not indicating receipt of the predetermined character from the target process.

8. The method according to claim 1, further comprising:
   creating a real-time kernel thread on the system kernel side to periodically transmit a heartbeat message to a hardware watchdog; and
   when a fatal problem occurs, stopping transmission of the heartbeat message to the hardware watchdog, wherein the hardware watchdog resets the system.

9. An apparatus for detecting unresponsiveness of a process, the apparatus comprising computer-executable logic operating in a memory, wherein the computer-executable program logic is configured to enable execution across one or more processors:
   for each target process in a plurality of target processes, create and activate a timer on a system kernel side to time the target process; and
   when timing of the timer exceeds a predetermined time threshold, determine the target process to be unresponsive, and perform a predetermined associated action;
   wherein the predetermined time threshold and the predetermined associated action are set in response to a setting command from the target process.

10. The apparatus according to claim 9, wherein the target process is a user space process.

11. The apparatus according to claim 9, further comprising:
   a heartbeat response module configured to, in response to receiving a heartbeat message from the target process, reset the timer to retime the target process.

12. The apparatus according to claim 11, wherein the timer records a flag indicating receipt of a predetermined character from the target process.

13. The apparatus according to claim 12, further configured to:
   obtain a character written by the target process from the heartbeat message; and
   in response to determining that the character is the predetermined character, set the flag indicating receipt of the predetermined character from the target process.

14. The apparatus according to claim 13, further comprising:
   in response to receiving a close message from the target process, perform a corresponding operation based on the flag indicating receipt of the predetermined character from the target process.

15. The apparatus according to claim 14, further configured to:
   stop the corresponding timer when the flag indicating receipt of the predetermined character from the target process; and
   keep the corresponding timer running when the flag is not indicating receipt of the predetermined character from the target process.

16. The apparatus according to claim 9, further configured to:
   create a real-time kernel thread on the system kernel side to periodically transmit a heartbeat message to a hardware watchdog; and
   when a fatal problem occurs, stop transmission of the heartbeat message to the hardware watchdog, wherein the hardware watchdog resets the system.

17. A computer program product for detecting process unresponsiveness, the computer program product being tangibly stored on a non-transitory computer readable medium and including computer executable instructions that, when being executed, cause the computer to
   for each target process in a plurality of target processes, creating and activating a timer on a system kernel side to time the target process; and
   when timing of the timer exceeds a predetermined time threshold, determining the target process to be unresponsive, and performing a predetermined associated action;
   wherein the predetermined time threshold and the predetermined associated action are set in response to a setting command from the target process.

* * * * *